(Model.)
W. D. SHERMAN.
HANGING CIRCULAR SAWS.
No. 292,594. Patented Jan. 29, 1884.
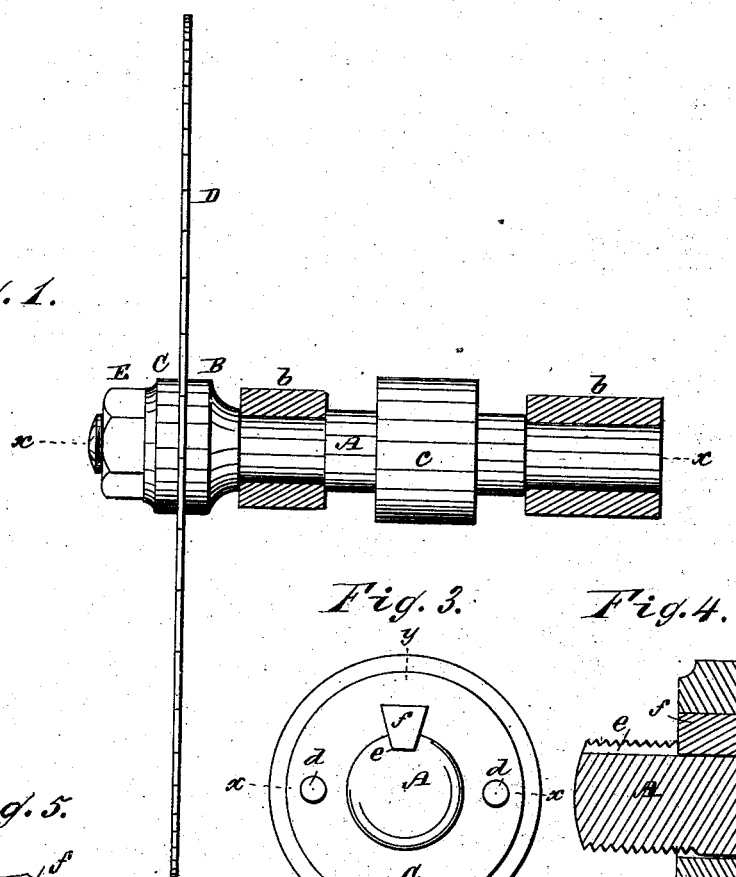
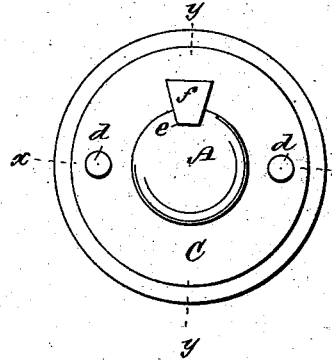
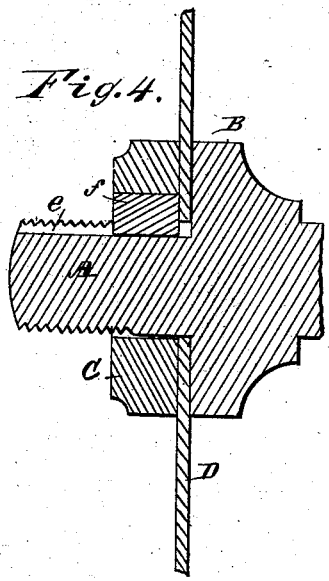
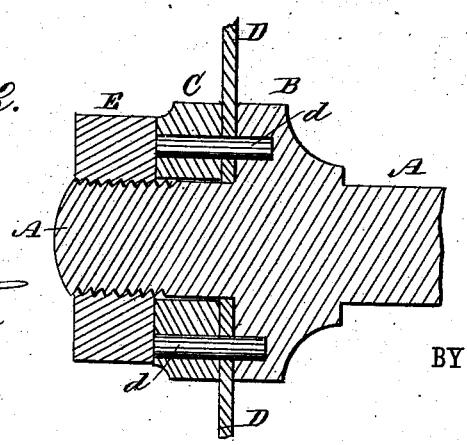
WITNESSES:
INVENTOR:
W. D. Sherman
BY Munn & Co.
ATTORNEYS.
N. PETERS. Photo-Lithographer. Washington, D. C.

UNITED STATES PATENT OFFICE.

WALLACE D. SHERMAN, OF GRAND HAVEN, MICHIGAN.

HANGING CIRCULAR SAWS.

SPECIFICATION forming part of Letters Patent No. 292,594, dated January 29, 1884.

Application filed December 6, 1883. (Model.)

*To all whom it may concern:*

Be it known that I, WALLACE D. SHERMAN, of Grand Haven, Ottawa county, Michigan, have invented a new and useful Improvement in Loose-Collar Attachments for Circular Saws, of which the following is a full, clear, and exact description.

This invention consists in a novel means of attaching and securing the loose collar which holds the saw on its arbor or mandrel, for operation in connection with the lug or driving pins arranged to project from the fast collar of said arbor or mandrel, and made to pass through holes in the saw and loose collar, said special means of connecting the loose collar with the arbor serving to relieve the lug-pins of wear, strain, and breakage, and holding the loose collar as firmly as a fast one, and preventing irregularities or obstructions being formed in the holes of the lug-pins and saw.

Reference is to be had to the accompanying drawings, forming part of this specification, in which similar letters of reference indicate corresponding parts in all the figures.

Figure 1 represents a longitudinal view of a circular-saw arbor with saw attached and my invention applied; also showing the bearings of said arbor in section. Fig. 2 is a longitudinal section, in part, of the same, upon a larger scale, on the line $x\ x$ in Figs. 1 and 3; Fig. 3, an end view from the loose collar end of the arbor, with the saw omitted. Fig. 4 is a longitudinal section, in part, upon the line $y\ y$ in Fig. 3, with the saw in place. Fig. 5 is a view in perspective of a key used to hold the loose collar on the saw-arbor.

A indicates the saw-arbor, $b\ b$ its bearings, and $c$ its driving-pulley.

B is the fast collar on the arbor, between which and the loose collar C the circular saw D is clamped and driven by pins $d\ d$, arranged to project from said fast collar, and so that they pass through holes in the saw and loose collar.

E is the nut which screws on the outer end of the arbor, and serves to tighten up the loose collar C against the saw.

Cut or otherwise formed in the outer end portion of the arbor, and extending as far as the fast collar B, is a longitudinal keyway, $e$, within which a key, $f$, in the loose collar C fits, or is free to slide, and whereby the loose collar is held as firmly as if it were a fast collar. Strain or wear and breakage of the pins $d\ d$, as liable to be produced by the resistance of the saw when at work, is prevented, as also irregularities or obstruction in the holes which said pins fit in the loose collar and saw.

The key $f$ is preferably made of dovetail shape in its transverse section, fitting a correspondingly-shaped groove in the loose collar, whereby it will remain attached to the loose collar when said collar is removed from the arbor.

Instead of the key $f$ being an independent device fitted to the loose collar C, it may be permanently fitted or secured thereto by making it an integral portion thereof or projection from and of one piece with said collar.

Having thus described my invention, I claim as new and desire to secure by Letters Patent—

1. In means for holding and fastening the loose or clamping collar on the arbor of a circular saw, the loose collar C, fitted with a key, $f$, in combination with the arbor A, having a keyway, $e$, and fast collar B, the saw-driving pins $d\ d$, arranged to engage with the loose collar, and the nut E, substantially as and for the purposes specified.

2. The combination, with the loose collar C, of the key $f$, of dovetail construction where it fits or enters within said collar, the saw-arbor A, having a keyway, $e$, along its outer end portion, the saw-driving pins $d\ d$, and the fast collar B, on or forming part of the arbor, essentially as shown and described.

WALLACE D. SHERMAN.

Witnesses:
GEO. A. FARR,
CHAS. E. SOULE.